(12) United States Patent
Steele

(10) Patent No.: US 6,626,969 B1
(45) Date of Patent: Sep. 30, 2003

(54) MOUNTING COLLAR FOR A VACUUM CLEANER FILTER BAG

(75) Inventor: Daniel L. Steele, Mentor, OH (US)

(73) Assignee: The Scott Fetzer Company, Westlake, OH (US)

( * ) Notice: Subject to any disclaimer, the term of this patent is extended or adjusted under 35 U.S.C. 154(b) by 0 days.

(21) Appl. No.: 10/115,325

(22) Filed: Apr. 2, 2002

(51) Int. Cl.[7] ................................................. A47L 9/14
(52) U.S. Cl. .......................... 55/374; 55/367; 55/373; 55/378; 55/381; 55/473; 55/DIG. 2; 15/347; 15/352
(58) Field of Search .......................... 55/367, 373, 374, 55/378, 381, 473, DIG. 2, DIG. 3; 15/347, 352

(56) References Cited

U.S. PATENT DOCUMENTS

| | | |
|---|---|---|
| 3,616,622 A | 11/1971 | Friedman |
| D251,668 S | 4/1979 | Asberg |
| 4,885,013 A | 12/1989 | Ahlf |
| 5,725,620 A | 3/1998 | Perea et al. |
| 5,725,623 A | 3/1998 | Bowerman et al. |
| 5,766,283 A * | 6/1998 | Bumb et al. .................. 55/367 |
| 5,772,712 A | 6/1998 | Perea et al. |
| 5,792,224 A * | 8/1998 | Fu et al. ......................... 55/374 |
| 5,935,280 A * | 8/1999 | Lee .............................. 55/378 |

* cited by examiner

Primary Examiner—Duane Smith
Assistant Examiner—Minh-Chau T. Pham
(74) Attorney, Agent, or Firm—Jones Day

(57) ABSTRACT

An apparatus for mounting a vacuum cleaner filter bag on a vacuum cleaner fill tube includes a filter bag panel. The panel is configured to be grasped by a hand to mount the bag on the fill tube. The panel has an inner edge defining an opening for receiving the fill tube when the bag is mounted on the fill tube. The panel further has an outer edge. A first recessed section of the outer edge is sized and shaped to receive a single finger of the hand when the hand grasps the panel. The first recessed section has a first innermost location. A second recessed section of the outer edge is sized and shaped to receive the thumb of the hand when the hand grasps the panel. The second recessed section has a second innermost location. The innermost locations are spaced apart from each other along an imaginary straight line extending across the opening.

15 Claims, 4 Drawing Sheets

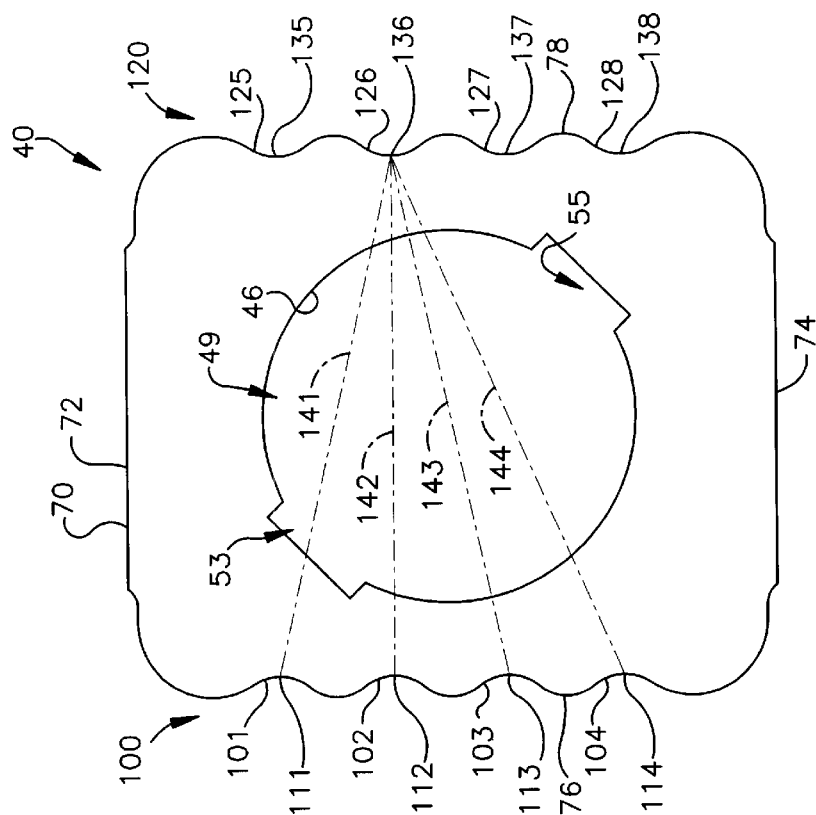
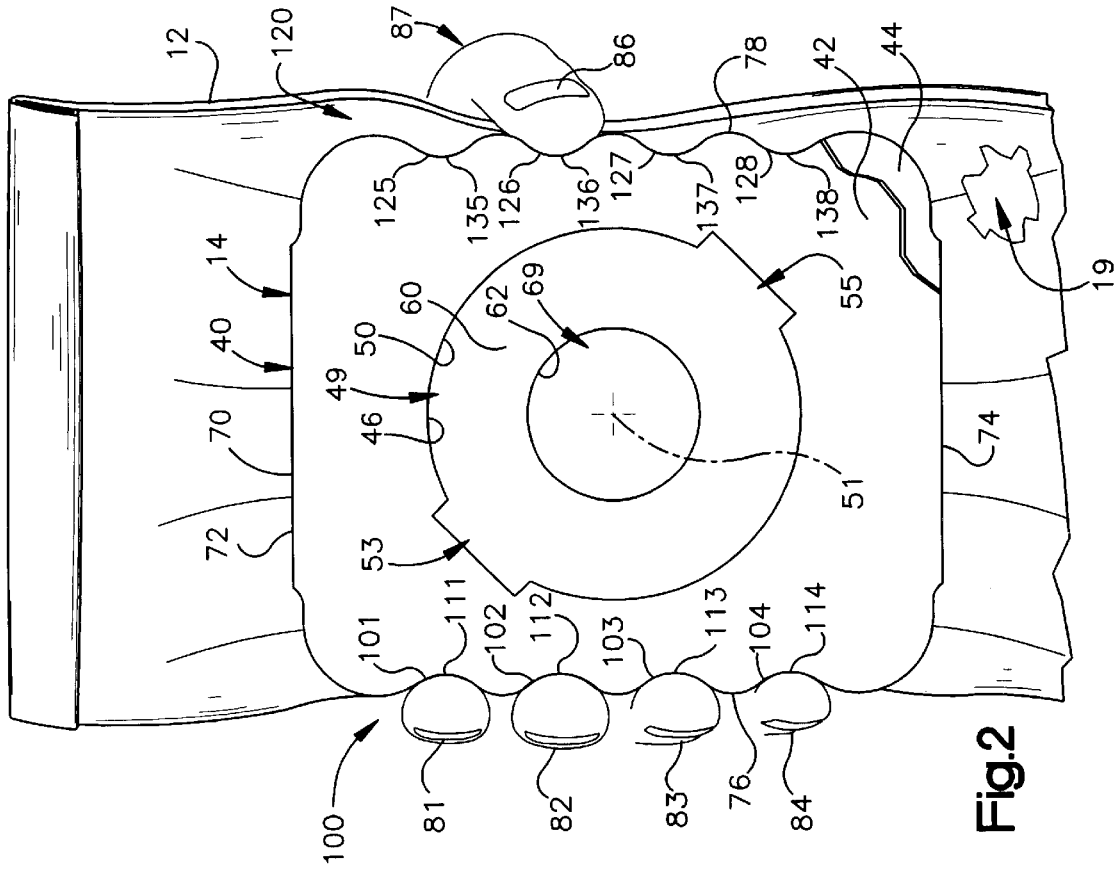

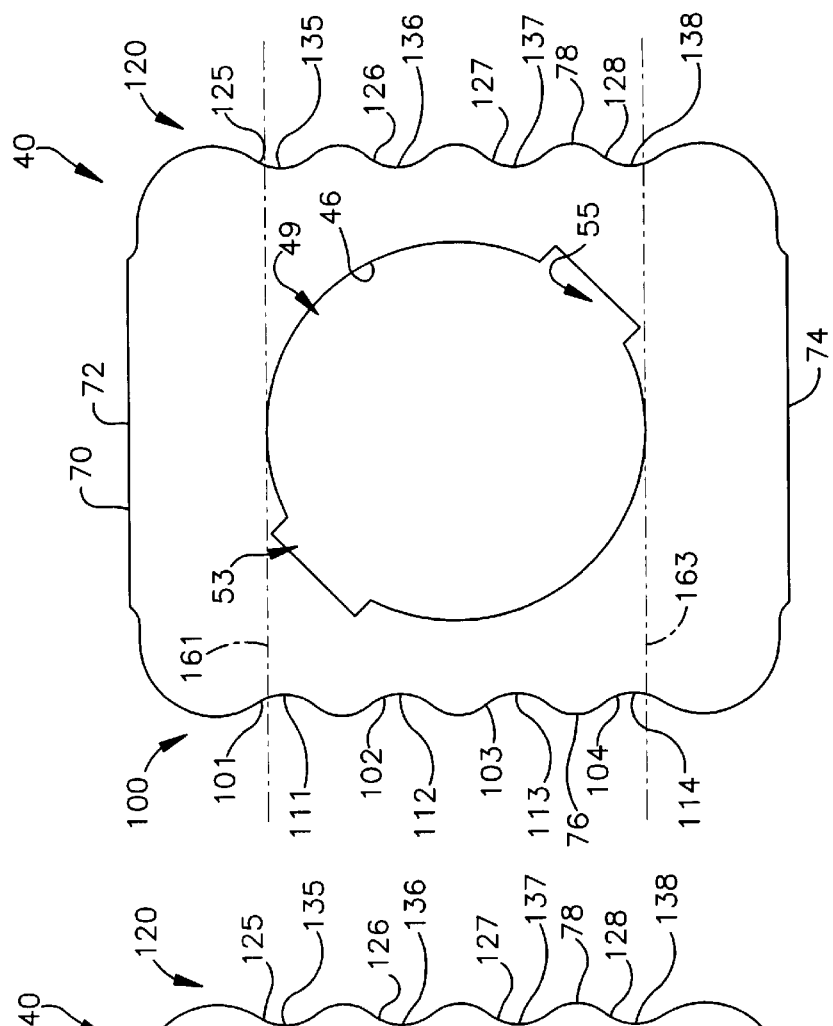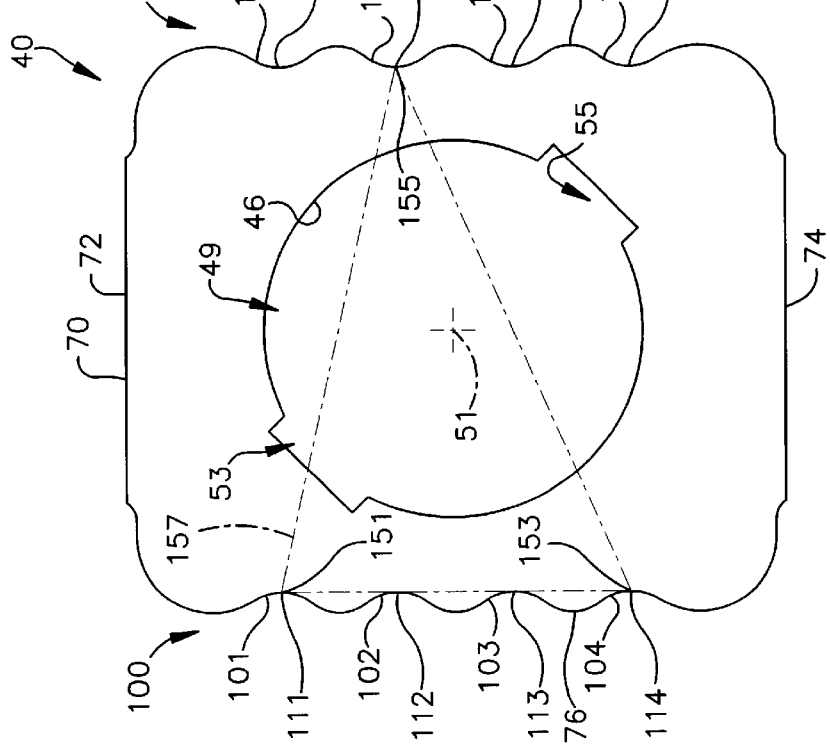

MOUNTING COLLAR FOR A VACUUM CLEANER FILTER BAG

BACKGROUND

A filter bag collects debris that is removed from household surfaces by a vacuum cleaner. A mounting collar on the filter bag has an opening that provides access to the interior of the bag. The bag is removably mounted on a vacuum cleaner fill tube by insertion of the fill tube through the opening in the collar.

SUMMARY

The present invention is an apparatus for mounting a vacuum cleaner filter bag on a vacuum cleaner fill tube. The apparatus comprises a filter bag panel configured to be grasped by a hand to mount the bag on the fill tube. An inner edge of the panel defines an opening for receiving the fill tube when the bag is mounted on the fill tube. The panel further has an outer edge. A first recessed section of the outer edge is sized and shaped to receive a single finger of the hand when the hand grasps the panel. The first recessed section has a first innermost location. A second recessed section of the outer edge is sized and shaped to receive the thumb of the hand when the hand grasps the panel. The second recessed section has a second innermost location. These innermost locations are spaced apart from each other along an imaginary straight line extending across the opening.

Preferably, the outer edge has an array of recessed sections comprising the first recessed section and other recessed sections. The recessed sections of the array are sized, shaped and located to receive corresponding fingers of the hand when the hand grasps the panel. The array of recessed sections is defined by an undulating contour of the outer edge.

The array is a first array, and each recessed section in the first array has an innermost location. The outer edge further has a second array of recessed locations comprising the second recessed section and other recessed sections. The recessed sections in the second array are sized, shaped and located to receive corresponding fingers of an opposite hand when the opposite hand grasps the panel. Each recessed section in the second array has an innermost location. Each innermost location of the second array is spaced apart from each innermost location of the first array along an imaginary straight line extending across the opening.

The inner edge has a circular portion centered on an axis. A third recessed section of the outer edge is sized and shaped to receive another finger of the hand when the hand grasps the panel. The third section has a third innermost location. The first, second and third innermost locations define the three corners of a triangle that encompasses the axis.

The opening has a notch. A projection of the fill tube can pass through the notch as the bag is mounted on the fill tube when the notch is circumferentially aligned with the projection. The projection can subsequently capture the panel on the fill tube after rotation of the panel about the fill tube to move the notch circumferentially out of alignment with the projection.

In another feature of the panel, the outer edge has top and bottom edge portions extending across the width of the panel. The outer edge further has first and second opposite side edge portions extending along the height of the panel. The first side edge portion has a recessed section that is sized and shaped to receive a single finger or thumb of the hand when the hand grasps the panel. The recessed section has an innermost location that is located such that the inner edge extends both above and below the innermost location.

BRIEF DESCRIPTION OF THE DRAWINGS

FIG. 2 is a front view of parts shown in FIG. 1;

FIG. 3 is a front view of a part shown in FIG. 2;

FIG. 4 is view similar to FIG. 3;

FIG. 5 is another view similar to FIG. 3; and

DESCRIPTION

Figure 1:
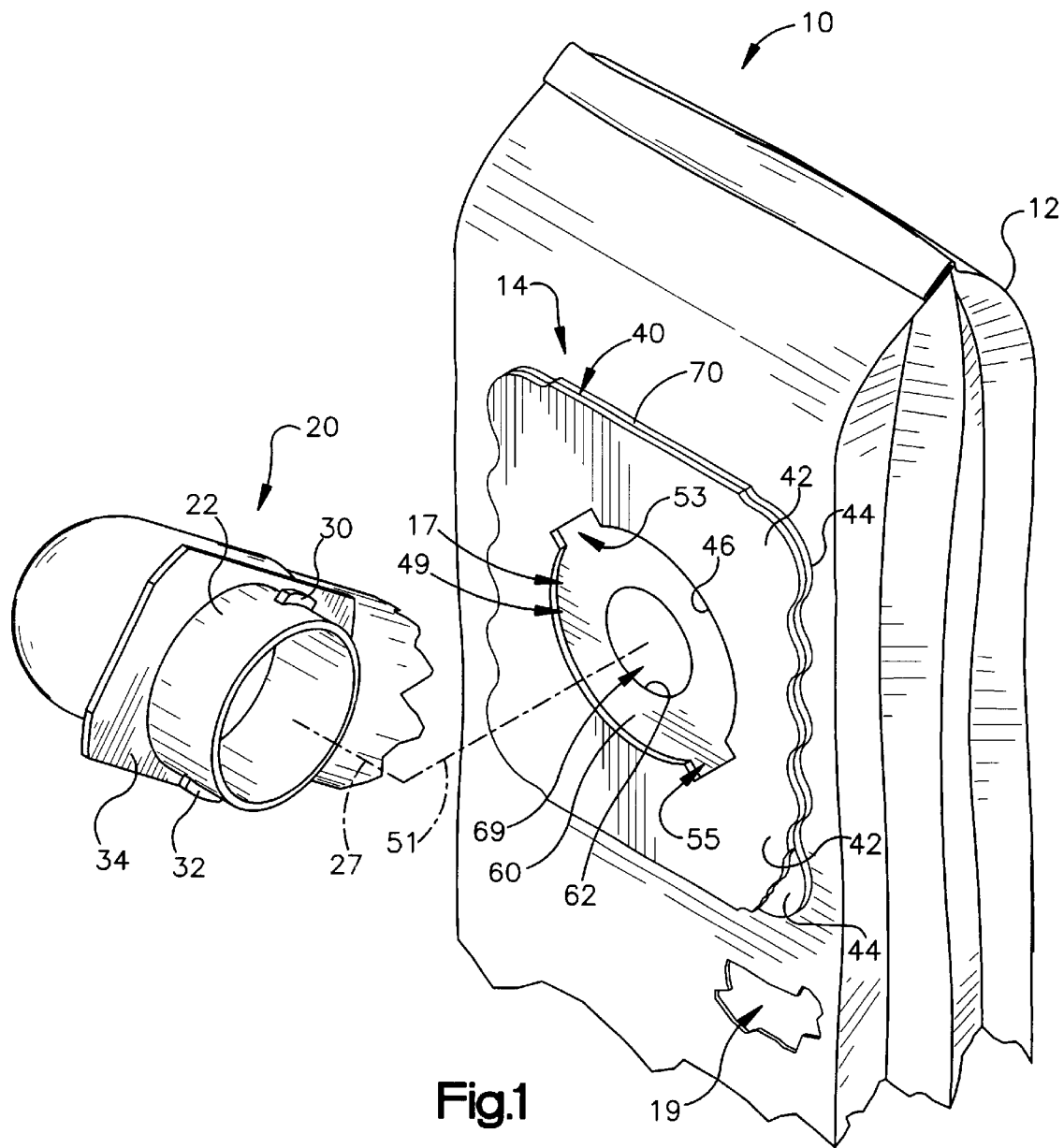
FIG. 1 is a perspective view of a vacuum cleaner fill tube and a vacuum cleaner filter bag, shown in a first relationship.

The apparatus 10 shown in FIG. 1 has parts which, as described below, are examples of the elements recited in the claims.

The apparatus 10 includes a disposable vacuum cleaner filter bag 12. A mounting collar 14 on the filter bag 12 has an opening 17 that provides access to the interior 19 of the bag 12. The apparatus 10 also includes a fill tube 20, which is part of a vacuum cleaner. The bag 12 is removably mounted on the fill tube 20 by insertion of the fill tube 20 through the collar opening 17. This procedure requires pushing and rotating the collar on the fill tube 20, as described below. In operation, the vacuum cleaner exhausts dirt laden air through the fill tube 20 into the bag 12.

As shown in FIG. 1, the fill tube 20 has a cylindrical outlet structure 22 centered on an axis 27. A pair of projections 30 and 32 extend radially outward from diametrically opposite sides of the outlet structure 22. An abutment plate 34 is located axially rearward of the projections 30 and 32. The abutment plate 34 extends radially outward from the outlet structure 22 about the full circumference of the outlet structure 22.

The filter bag 12 is a container formed of layers of paper and melt blown polypropylene. The mounting collar 14 extends across an opening (not shown) in the bag 12.

As shown in FIG. 2, the collar 14 has a rigid paperboard panel 40 attached to the filter bag 12. The panel 40 is formed of two paperboard plates 42 and 44 that are adhered together. An inner edge 46 of the panel 40 defines an opening 49. The inner edge 46 has a circular portion 50 that is centered on an axis 51. The circular portion 50 is slightly larger than the outlet structure 22 (FIG. 1). This provides a close fit between the circular portion 50 and the outlet structure 22 when the panel opening 49 receives the outlet structure 22. The circular portion 50 is interrupted by two rectangular notches 53 and 55 that are located diametrically opposite each other.

Extending across the panel opening 49 is an elastomeric diaphragm 60. The diaphragm 60 is adhered to the panel 20 between the paperboard plates 42 and 44. An inner edge 62 of the diaphragm 60 defines a circular opening 69. The opening 69 is centered on the axis 51 of the panel opening 49, thereby providing access to the bag interior 19. The diaphragm opening 69 is smaller than the outlet structure 22 (FIG. 1).

An outer edge 70 of the panel 40 has top and bottom edge portions 72 and 74 extending horizontally across the width of the panel 40. The outer edge 70 further has first and second opposite side edge portions 76 and 78 extending vertically along the height of the panel 40. When mounting the bag 12 on the fill tube 20 (FIG. 1), the panel 40 is grasped by an operator. For this purpose, the side edge portions 76 and 78 are configured to receive the fingers and thumb of either hand of the operator. This is illustrated in FIG. 2 with reference to the fingers 81, 82, 83, 84 and the thumb 86 of the right hand 87.

To facilitate grasping of the panel 40, the first side edge 76 has a first linear array 100 of recessed sections. The recessed sections together comprise first, second, third and fourth recessed sections 101, 102, 103 and 104 that are defined by an undulating contour of the first side edge portion 76. The four recessed sections 101, 102, 103 and 104 are sized, shaped and located to receive the four corresponding fingers 81, 82, 83 and 84 of the right hand 87 when the right hand 87 grasps the panel 40. Individually, each recessed section 101, 102, 103 and 104 is sized and shaped to receive a single finger 81, 82, 83, 84 of the right hand 87 when the right hand 87 grasps the panel 40. This resists slippage between the fingers 81, 82, 83, 84 and the first side edge 76 when pushing and rotating the collar 14 on the fill tube 20. Similarly, each recessed section 101, 102, 103 and 104 is sized and shaped to receive the thumb of the left hand when the left hand grasps the collar 14. This resists slippage between the thumb and the recessed sections 101, 102, 103 and 104. The first, second, third and fourth recessed sections 101, 102, 103 and 104 have arcuate shapes defining first, second, third and fourth innermost locations 111, 112, 113 and 114.

The second side edge portion 78 has a second linear array 120 of recessed sections. This second array 120 is a mirror image of the first array 100. The recessed sections of the second array 120 comprise fifth, sixth, seventh and eighth recessed sections 125, 126, 127 and 128 that are defined by an undulating contour of the second side edge portion 78. The four recessed sections 125, 126, 127 and 128 of the second array 120 together are sized, shaped and located to receive four corresponding fingers of the left hand (not shown) when the left hand grasps the collar 14. Individually, each recessed section 125, 126, 127 and 128 of the second array 120, like the recessed sections of the first array 100, is sized and shaped to receive a single finger or thumb when the hand grasps the panel 40. The fifth, sixth, seventh and eighth recessed sections 125, 126, 127 and 128 have arcuate shapes defining fifth, sixth, seventh and eighth innermost locations 135, 136, 137 and 138.

As mentioned above, the procedure for mounting the collar 14 on the fill tube 20 (FIG. 1) includes pushing and rotating the collar 14 on the fill tube 20. To facilitate the pushing and rotating, the fingers and thumb are located at preferred positions relative to the panel opening 49. This is explained as follows, with reference to the right index finger 81 and the right thumb 86 in FIG. 2.

As shown in FIG. 2, the index finger 81 is vertically centered on and engages the first innermost location 111 in the first array 100. The thumb 86 is vertically centered on and engages the sixth innermost location 136 in the second array 120. From their respective positions, the finger 81 and the thumb 86 generate an axial force to push the panel 40 on the fill tube 20 (FIG. 1) or a rotational force to rotate the panel 40 about the fill tube 20. As shown in FIG. 3, the axial and rotational forces are applied along a line of force represented by an imaginary straight line 141 extending from the first innermost location 111 to the sixth innermost location 136. The line of force 141 extends across the inner edge 46 of the panel 40, which is where the axial force is needed to push the inner edge 46 on the fill tube 20. It is also where the rotational force is needed to rotate the inner edge 46 about the fill tube 20. The finger 81 and thumb 86 (FIG. 2) are thus in preferred positions for pushing and rotating the collar 14. The preferred positions are defined by the finger 81 and thumb 86 being located at opposite sides of the opening 49, so that the line of force 141 extends across the panel opening 46. If the finger 81 and thumb 86 were not at opposite sides of the opening 49, the line of force 141 would be spaced from the opening 49 and thus less effective for pushing and rotating the panel 40.

Like the first innermost location 111, the second innermost location 112 is also spaced apart from the sixth innermost location 136 along an imaginary straight line 142 extending across the panel opening 49. In fact, all of the innermost locations 111, 112, 113 and 114 in the first array 100 are spaced apart from the sixth innermost location 136 in the second array 120 along respective imaginary straight lines 141, 142, 143 and 144 extending across the opening 49. This ensures that all four fingers 81, 82, 83 and 84 are preferably positioned relative to the thumb 86 for pushing and rotating the collar 14.

The positions of the innermost locations 111, 112, 113 and 114 in the first array 100 have thus far been defined with respect to only the sixth innermost location 136. However, they can be similarly described with respect to all of the innermost locations 135, 136, 137 and 138 in the second array 120. Specifically, each innermost location 111, 112, 113 and 114 in the first array 100 is spaced apart from each innermost location 135, 136, 137 and 138 in the second array 120 along an imaginary straight line extending across the panel opening 49.

Another feature for facilitating pushing and rotating the collar 14 (FIG. 2) is illustrated in FIG. 4. The feature relates to the positions of the innermost locations relative to the central axis 51 of the opening 49. This is illustrated with reference the first, fourth and sixth innermost locations 111, 114 and 136. These three innermost locations 111, 114 and 136 define three corners 151, 153 and 155 of a triangle 157 that encompasses the central axis 51. Locating three innermost locations in this way causes the central axis 51 to be surrounded by two fingers 81 and 84 and the thumb 86 (FIG. 2). This facilitates both pushing and rotating the panel 40 on the fill tube 20.

A feature for facilitating particularly pushing the panel 40 on the fill tube 20 is illustrated in FIG. 5. The inner edge 46 extends both above and below all eight of the innermost locations 111, 112, 113, 114, 135, 136, 137 and 138. This is illustrated with the aid of dashed lines 161 and 163 that delineate the top and bottom extents of the opening 49. Locating innermost locations in this way tends to position the corresponding fingers closer to the inner edge 46. This is where the axial force is needed for pushing the inner edge 46 on the fill tube 20.

A procedure for mounting the bag 12 on the fill tube 20 is as follows. First, the fill tube 20 (FIG. 1) is grasped with the left hand. As shown in FIG. 2, the collar 14 is grasped with the right hand 161. This is done by placing the right palm behind the bag 12 and wrapping the fingers 81, 82, 83 and 84 and thumb 86 about the bag 12. The four fingers 81, 82, 83 and 84 engage and are received by the four recessed sections 101, 102, 103 and 104 of the first side edge portion 76. The thumb 86 can engage any one of the recessed sections 125, 126, 127 and 128 of the second side edge portion 78. However, in this example, the thumb 86 engages and is received by the sixth recessed section 126.

Next, the collar 14 is positioned axially forward of the fill tube 20 shown in FIG. 1. The collar 14 is aligned such that the axis 51 of the collar 14 coincides with the axis 27 of the fill tube 20. The collar 14 is oriented relative to the fill tube 20 such that the notches 53 and 55 are circumferentially aligned with the tube projections 30 and 32.

Figure 6:
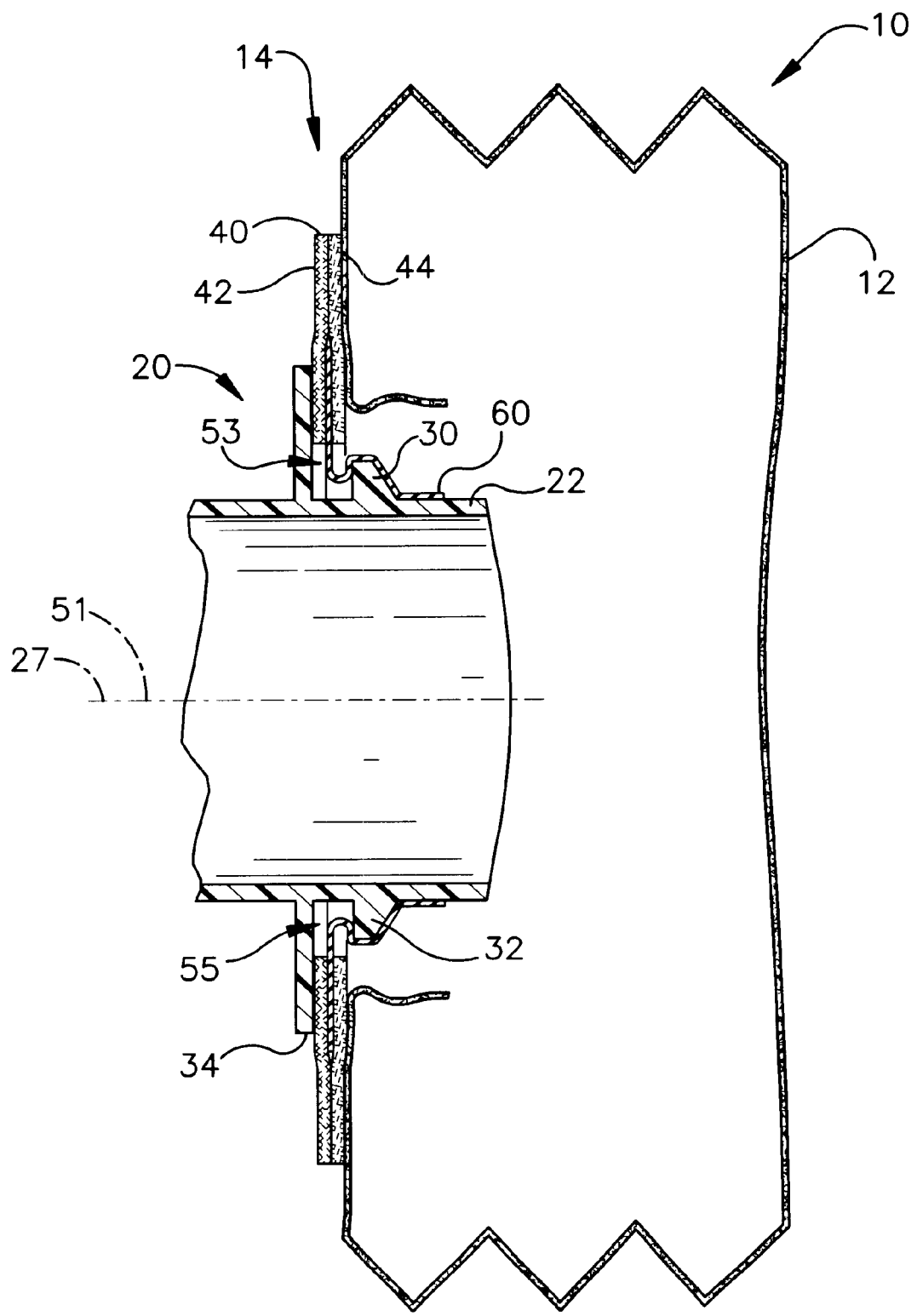
FIG. 6 is a top sectional view of the parts of FIG. 1, shown in a second relationship.

Subsequently, the operator pushes the collar 14 axially forward to receive the outlet structure 22. Since the diaphragm opening 69 is initially smaller than the outlet structure 22, the inner edge 62 of the diaphragm 60 is forced to elastically lengthen to receive the outlet structure 22. During this process, the diaphragm 60 resists the insertion of the outlet structure 22. Therefore, force is required to push the collar 14 on the outlet structure 22. As the outlet structure 22 progresses through the panel opening 49, the projections 30 and 32 pass through the notches 53 and 55. This is made possible by each notch 53 and 55 being circumferentially aligned with the respective projection 30 and 32. The collar 14 is moved axially into position between the projections 30 and 32 and the abutment plate 34, as shown in FIG. 6.

The collar 14 is locked in place by rotating the collar 14 circumferentially about the axis 27 of the fill tube 20. This moves the projections 30 and 32 circumferentially out of alignment with the notches 53 and 55. The panel 40 is then captured between the abutment plate 34 and the projections 30 and 32. The diaphragm 60 engages the outlet structure 22 with elastic force and thus resists the rotation. Therefore, force is required to rotate the collar 14 about the fill tube 20.

To remove the bag 12, the fingers 81, 82, 83 and 84 (FIG. 2) and the thumb 86 grasp the collar 14 as described above. The collar 14 is rotated about the axis 27 of the fill tube 20 to circumferentially align the projections 30 and 32 with the notches 53 and 55. The projections 30 and 32 pass through the notches 53 and 55 as the fill tube 20 is drawn out of the panel opening 49.

In the procedure described above, the collar 14 is grasped by the right hand 87, as shown in FIG. 2. Consequently, all four of the recessed sections 101, 102, 103 and 104 in the first side edge portion 76 are used to receive the four fingers 81, 82, 83 and 84. In contrast, only one recessed section 126 in the second side edge portion 78 is used to receive the thumb 86. Nevertheless, the second side edge portion 78 has four recessed sections 121, 122, 123 and 124. This is to enable the collar 14 to be grasped by the left hand (not shown). In such a case, the four fingers of the left hand are received by the four recessed sections 125, 126, 127 and 128 in the second side edge portion 78. The left thumb is received by any one of the recessed sections 101, 102, 103 and 104 in the first side edge portion 76.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for mounting a vacuum cleaner filter bag on a vacuum cleaner fill tube, said apparatus comprising:
   a filter bag panel configured to be grasped by a hand to mount the bag on the fill tube;
   said panel having an inner edge defining an opening for receiving the fill tube when the bag is mounted on the fill tube;
   said panel further having an outer edge;
   said outer edge having a first recessed section that is sized and shaped to receive a single finger of the hand when the hand grasps said panel, said first recessed section having a first innermost location; and
   said outer edge further having a second recessed section that is sized and shaped to receive the thumb of the hand when the hand grasps said panel, said second recessed section having a second innermost location;
   said innermost locations being spaced apart from each other along an imaginary straight line extending across said opening.

2. An apparatus as defined in claim 1 wherein said outer edge has an array of recessed sections comprising said first recessed section and other recessed sections, said recessed sections of said array being sized, shaped and located to receive corresponding fingers of the hand when the hand grasps said panel.

3. An apparatus as defined in claim 2 wherein said array of recessed sections is defined by an undulating contour of said outer edge.

4. An apparatus as defined in claim 2 wherein said array of recessed sections is a linear array.

5. An apparatus as defined in claim 2 wherein each recessed section in said array has an innermost location that is spaced apart from said second innermost location along an imaginary straight line extending across said opening.

6. An apparatus as defined in claim 2 wherein said array is a first array and each recessed section in said first array has an innermost location, and wherein said outer edge further has a second array of recessed locations comprising said second recessed section and other recessed sections, said recessed sections in said second array being sized, shaped and located to receive corresponding fingers of an opposite hand when the opposite hand grasps said panel, each recessed section in said second array having an innermost location, and each innermost location of said second array being spaced apart from each innermost location of said first array along an imaginary straight line extending across said opening.

7. An apparatus as defined in claim 2 wherein said array is a first array, and wherein said outer edge further has a second array of recessed locations comprising said second recessed section and other recessed sections, said recessed sections in said second array being sized, shaped and located to receive corresponding fingers of an opposite hand when the opposite hand grasps said panel, and said first and second arrays being mirror images of each other.

8. An apparatus as defined in claim 1 wherein said inner edge has a circular portion centered on an axis, and said outer edge has a third recessed section that is sized and shaped to receive another finger of the hand when the hand grasps said panel and that has a third innermost location, and wherein said first, second and third innermost locations define the three corners of a triangle that encompasses said axis.

9. An apparatus as defined in claim 1 wherein said opening has a notch, whereby a projection of the fill tube can pass through said notch as the bag is mounted on the fill tube when said notch is circumferentially aligned with the projection, and whereby the projection can subsequently capture said panel on the fill tube after rotation of said panel about the fill tube to move said notch circumferentially out of alignment with the projection.

10. An apparatus for mounting a vacuum cleaner filter bag on a vacuum cleaner fill tube, said apparatus comprising:
   a filter bag panel configured to be grasped by a hand to mount the bag on the fill tube;

said panel having an inner edge defining an opening for receiving the fill tube when the bag is mounted on the fill tube; and said panel further having an outer edge having top and bottom edge portions extending across the width of said panel, and first and second opposite side edge portions extending along the height of said panel; and said first side edge portion having a recessed section that is sized and shaped to receive a single finger or thumb of the hand when the hand grasps said panel, said recessed section having an innermost location that is located such that said inner edge extends both above and below said innermost location.

11. An apparatus as defined in claim 10 wherein said first side edge portion has an array of recessed sections comprising said first recessed section and other recessed sections, said recessed sections in said array being sized, shaped and located to receive corresponding fingers of the hand when the hand grasps said panel.

12. An apparatus as defined in claim 11 wherein said array of recessed sections is defined by an undulating contour of said first side edge portion.

13. An apparatus as defined in claim 11 wherein said array of recessed sections is a linear array.

14. An apparatus as defined in claim 11 wherein said inner edge extends both above and below all of said innermost locations of said array.

15. An apparatus as defined in claim 10 wherein said opening has a notch, whereby a projection of the fill tube can pass through said notch as the bag is mounted on the fill tube when said notch is circumferentially aligned with the projection, and whereby the projection can subsequently capture said panel on the fill tube after rotation of said panel about the fill tube to move said notch circumferentially out of alignment with the projection.

* * * * *